(12) United States Patent
Kim

(10) Patent No.: US 7,430,960 B2
(45) Date of Patent: Oct. 7, 2008

(54) APPARATUS FOR REMOVING FOREIGN MATTERS FROM CONSTRUCTION WASTE

(76) Inventor: Won-Keuk Kim, 189-359 Annyeong-ri, Taean-eup, Hwaseong-si, Gyeonggi-do (KR) 445-976

( * ) Notice: Subject to any disclaimer, the term of this patent is extended or adjusted under 35 U.S.C. 154(b) by 380 days.

(21) Appl. No.: 11/286,159

(22) Filed: Nov. 23, 2005

(65) Prior Publication Data

US 2007/0017390 A1      Jan. 25, 2007

(30) Foreign Application Priority Data

Jul. 20, 2005    (KR) .................... 10-2005-0066001

(51) Int. Cl.
*B30B 15/34*    (2006.01)
(52) U.S. Cl. .................. 100/316; 100/323; 100/326; 100/215; 100/245
(58) Field of Classification Search .............. 100/240, 100/245, 299, 305, 315, 316, 317, 318, 322, 100/323, 903, 906, 215, 326; 241/65, 101.2
See application file for complete search history.

(56) References Cited

U.S. PATENT DOCUMENTS

| | | | | |
|---|---|---|---|---|
| 2,362,701 A | * | 11/1944 | Koehring | .................... 29/34 R |
| 2,408,810 A | * | 10/1946 | Puening | ........................ 241/17 |
| 3,833,333 A | * | 9/1974 | Britten | ........................ 425/406 |
| 5,542,348 A | * | 8/1996 | Bendzick | ...................... 100/37 |
| 5,873,304 A | * | 2/1999 | Ruf | .............................. 100/97 |
| 6,874,411 B2 | * | 4/2005 | Nakamura et al. | ............ 100/37 |
| 2005/0109226 A1 | * | 5/2005 | Schroeder et al. | ........... 100/233 |

* cited by examiner

*Primary Examiner*—Jimmy T Nguyen
(74) *Attorney, Agent, or Firm*—Levine & Mandelbaum

(57) ABSTRACT

An apparatus for removing foreign matters from construction waste. A feeding section is installed at a lower end of a hopper. A heating and compressing section has an entrance which is coupled to the feeding section and an exit which is defined at a lower end of the heating and compressing section. A shooter opening and closing section is coupled to the exit of the heating and compressing section. The heating and compressing section comprises a hollow casing having a vertical flange on a side thereof, a compression cylinder installed on the casing, a compression plunger fitted into the casing and coupled to a piston rod of the compression cylinder, and a band heater wound on a circumferential outer surface of and adjacent to a lower end of the casing.

4 Claims, 6 Drawing Sheets

APPARATUS FOR REMOVING FOREIGN MATTERS FROM CONSTRUCTION WASTE

BACKGROUND OF THE INVENTION

1. Field of the Invention

The present invention relates, in general, to an apparatus for removing foreign matters from construction waste and, more particularly, to an apparatus for removing foreign matters from construction waste, wherein foreign matters such as Styrofoam, vinyl, paper, wood scraps, and so on, contained in soil sorted to have a substantially uniform grain size after undergoing a crushing process, are sucked into a cyclone by suction force from a blower, collected at a place, and then heated and compressed to a reduced volume to improve foreign matter separation efficiency, whereby it is possible to prevent the fine powder of the foreign matters from rising in the air, avoid the pollution of the surrounding environment and obtain quality recycled soil.

2. Description of the Prior Art

As is generally known in the art, construction waste is crushed to have a substantially uniform size and is conveyed to a wet or dry type separation apparatus in which the foreign matters contained in the crushed construction waste and having a substantial size are removed. Then, the crushed construction waste deprived of the foreign matters is sorted by size and material to be recycled.

About 30~50% of the construction waste introduced into the wet or dry type separation apparatus is composed of soil having a fine grain size, and the remainder is composed of aggregate having a large grain size.

At this time, since the soil having a fine grain size still contains foreign matters such as Styrofoam, vinyl, paper, wood scraps, and so on, which have a grain size less than that of the soil, the soil cannot be properly recycled.

In order to remove the foreign matters contained in soil, the soil containing foreign matters is freely dropped from a conveyor and air is supplied toward the falling soil using a blower to separate the foreign matters from the soil.

However, this method has a problem in that not only the foreign matters but also the soil is scattered while separating the foreign matters from the soil using the blast of air from the blower and the foreign matters cannot be effectively separated. Therefore, a foreign matter separation rate decreases and it is difficult to recycle the soil.

SUMMARY OF THE INVENTION

Accordingly, the present invention has been made keeping in mind the above problems occurring in the prior art, and an object of the present invention is to provide an apparatus for removing foreign matters from construction waste, wherein foreign matters such as Styrofoam, vinyl, paper, wood scraps, and so on, separated from the soil in a cyclone and having a substantially fine grain size are collected at a place and then heated and compressed to a reduced volume to be easily dealt with, whereby it is possible to prevent the fine foreign matters from rising to the surrounding environment, avoid the pollution of the surrounding environment and obtain quality recycled soil.

In order to achieve the above object, according to one aspect of the present invention, there is provided an apparatus for removing foreign matters from construction waste, comprising a feeding section installed at a lower end of a hopper; a heating and compressing section having an entrance which is coupled to the feeding section and an exit which is defined at a lower end of the heating and compressing section; and a shooter opening and closing section coupled to the exit of the heating and compressing section; wherein the heating and compressing section comprises a hollow casing having a vertical flange on a side thereof, a compression cylinder installed on the casing, a compression plunger fitted into the casing and coupled to a piston rod of the compression cylinder, and a band heater wound on a circumferential outer surface of and adjacent to a lower end of the casing.

According to another aspect of the present invention, the shooter opening and closing section has an opening and closing body which comprises a panel fitted around the lower end of the casing and having a pair of sliding channels defined on both sides of a lower end thereof; and a shooter which is to be fitted into the sliding channels is coupled to a piston rod of an opening and closing cylinder secured to a frame.

According to another aspect of the present invention, a heating section is provided below the shooter opening and closing section in such a way as to be capable of reciprocation in a vertical direction; the shooter has a pair of connection members which are respectively connected to both sides of the shooter to extend in the vertical direction and have a predetermined length; a support panel is integrally coupled to lower ends of the connection members to extend in a horizontal direction and is defined with a through-hole; a heater support plate, into which a plurality of heaters are fitted, is placed between the shooter and the support panel and is coupled to a piston rod of a moving cylinder which is secured to the support panel; and the shooter which faces the heater support plate is defined with a plurality of heater guide holes through which the heaters pass, respectively.

According to still another aspect of the present invention, the compression plunger has a cylindrical configuration and is defined at an upper end thereof with a depression which has a predetermined depth; and an internal thread is formed at a center portion of the compression plunger in the depression such that a lower end of the piston rod of the compression cylinder is threadedly coupled to the internal thread along with a release prevention nut.

According to yet still another aspect of the present invention, the heater support plate has a box-shaped configuration which is opened at a lower end thereof; a plurality of threaded holes are defined through the heater support plate; and threaded portions are formed adjacent to lower ends of the heaters such that the threaded portions are threadedly coupled to the heater support plate in the threaded holes.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
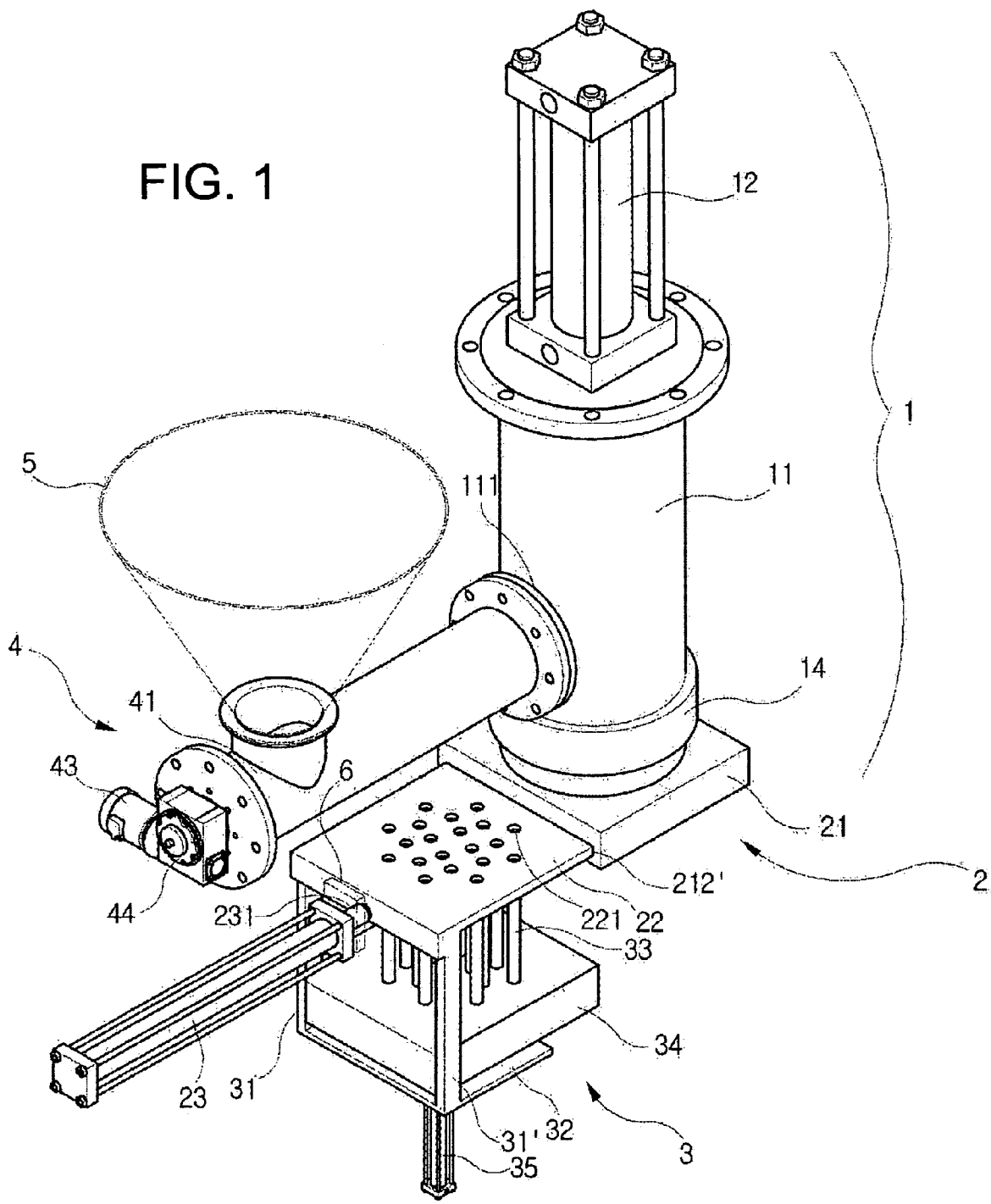
FIG. 1 is a perspective view illustrating an apparatus for removing foreign matters from construction waste in accordance with an embodiment of the present invention.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 2:
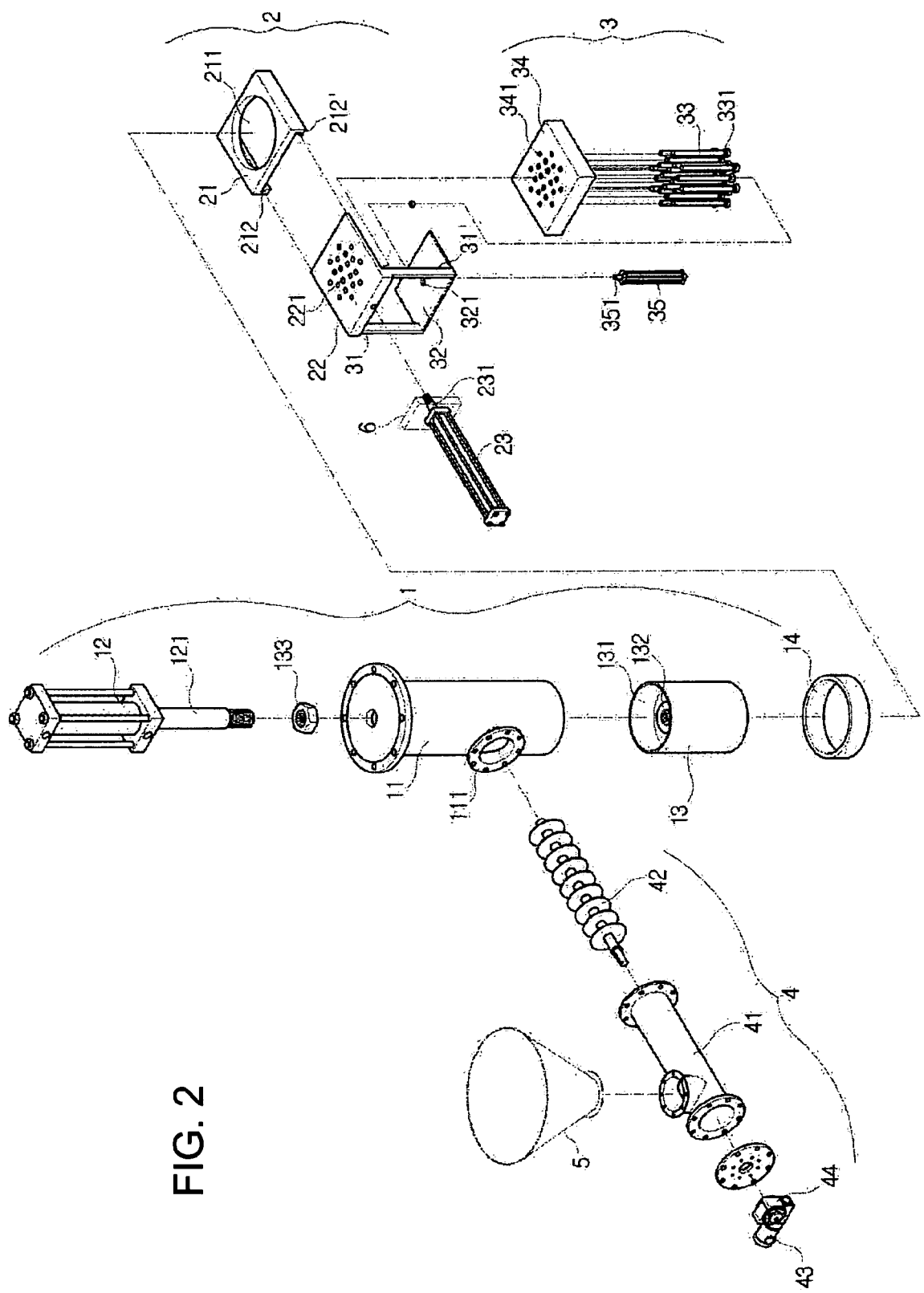
FIG. 2 is an exploded perspective view of the apparatus for removing foreign matters from construction waste according to the present invention.

Referring to FIGS. 1 and 2, an apparatus for removing foreign matters from construction waste in accordance with an embodiment of the present invention includes a heating and compressing section 1, a shooter opening and closing section 2, a heating section 3, a feeding section 4, and a hopper 5.

The heating and compressing section 1 functions to heat and compress foreign matters which are introduced into a cyclone (not shown) and then separated from the air, to a reduced volume. A flange 111 is formed at a side of a hollow casing 11 which extends in the vertical direction, and the exit of the feeding section 4 which will be described later is coupled to the flange 111.

The lower end of a compression cylinder 12 which is selectively actuated by fluid pressure is coupled to the upper end of the casing 11. The piston 121 of the compression cylinder 12 extends into the casing 11, and a compression plunger 13 is coupled to the piston 121 of the compression cylinder 12 to be reciprocated in the vertical direction.

The outer surface of the compression plunger 13 is brought into close contact with the inner surface of the casing 11 to maintain airtightness. The compression plunger 13 compresses and then discharges the foreign matters which are filled and melted or softened in the casing 11.

To this end, the compression plunger 13 has a cylindrical configuration and is defined at the upper end thereof with a depression 131 which has a predetermined depth. An internal thread 132 is formed at the center portion of the compression plunger 13 in the depression 131 such that the lower end of the piston rod 121 of the compression cylinder 12 is threadedly coupled to the internal thread 132.

In order to prevent the compression plunger 13 from being released from the piston rod 121 of the compression cylinder 12 after the piston rod 121 is threadedly coupled to the internal thread 132, a release prevention nut 133 is threadedly coupled to the piston rod 121 of the compression cylinder 12.

A band heater 14 having a predetermined thickness is wound on the outer surface of the lower end of the casing 11 so that the foreign matters filled in the casing 11 can be easily melted or softened. Since the lower part of the casing 11 is kept in a heated state, the discharge of the foreign matters can be smoothly implemented.

The shooter opening and closing section 2 functions to selectively open and close the inside space of the casing 11 so that a predetermined amount of foreign matters fed into the casing 11 through the feeding section 4 can be collected, melted or softened and compressed, and that the aggregate of the melted or softened and compressed foreign matters can be discharged out of the casing 11.

To this end, the shooter opening and closing section 2 includes an opening and closing body 21. The opening and closing body 21 comprises a panel defined with an opening 211 into which the lower end of the casing 11 is fitted. A pair of sliding channels 212 and 212' are defined on both sides of the lower surface of the panel to extend in the lengthwise direction of the panel. The sliding channels 212 and 212' are open toward the center of the panel and are opposite to each other. A shooter 22 to be fitted into the sliding channels 212 and 212' is coupled to the piston rod 231 of an opening and closing cylinder 23 which is secured to a frame 6 such that the shooter 22 can be selectively reciprocated in the horizontal direction.

The heating section 3 is provided below the shooter opening and closing section 2 in such a way as to be capable of reciprocation in the vertical direction. The heating section 3 functions to apply heat to and thereby melt or soften the foreign matters which are introduced into the casing 11 through the exit of the feeding section 4 with the lower end of the casing 11 closed by the opening and closing body 21.

The shooter 22 has a pair of connection members 31 and 31' which are respectively connected to both sides of the shooter 22. The connection members 31 and 31' extend in the vertical direction and have a predetermined length. A support panel 32 is integrally coupled to the lower ends of the connection members 31 and 3'. The support panel 32 extends in the horizontal direction and has a pre-selected thickness and area.

A through-hole 321 is defined in the center of the support panel 32. The upper end of a moving cylinder 35 is secured to the support panel 32 around the through-hole 321, and the piston rod 351 of the moving cylinder 35 passes through the through-hole 321 to be reciprocated in the vertical direction.

A heater support plate 34 is placed between the shooter 22 and the support panel 32, and a plurality of heaters 33 are fitted through the heater support plate 34. A plurality of guide holes 221 are defined through the shooter 22 so that the guide holes 221 correspond to the heaters 33, respectively. By these facts, the heaters 33 can be moved upward by the piston rod 351 of the moving cylinder 35 to project out of the shooter 22 and extend into the casing 11 through the lower end of the casing 11. Also, the heaters 33 can be moved downward by the piston rod 351 of the moving cylinder 35 to be retracted into the guide holes 221 of the shooter 22 so that the shooter 22 can be reciprocated forward and rearward along the sliding channels 212 and 212'.

The heater support plate 34 has a box-shaped configuration which is open at the lower end thereof. A plurality of threaded holes 341 are defined through the heater support plate 34. Threaded portions 331 are formed adjacent to the lower ends of the heaters 33 such that the threaded portions 331 can be threadedly coupled to the heater support plate 34 in the threaded holes 341.

The feeding section 4 allows the foreign matters which are separated from the air in the course of passing through the cyclone, to be collected through the hopper 5 at a place. The foreign matters collected at the place are introduced into the casing 11 which constitutes the heating and compressing section 1. A feeding body 41 is coupled to the lower end of the hopper 5, and a screw member 42 is disposed in the feeding body 41. A portion of the screw member 42 which projects out of the feeding body 41 is coupled to a reduction gear 44 which in turn is connected to a motor 43.

Hereafter, operations of the apparatus for removing foreign matters from construction waste according to the present invention, constructed as mentioned above, will be described. First, the foreign matters, which are separated in the course of passing through the cyclone (not shown) and then fell down, are collected through the hopper 5 in the feeding body 41 which is coupled to the lower end of the hopper 5. As the screw 42 is rotated by the torque outputted via the reduction gear 44 from the motor 43, the foreign matters collected in the feeding body 41 are introduced into the casing 11.

Figure 3A:
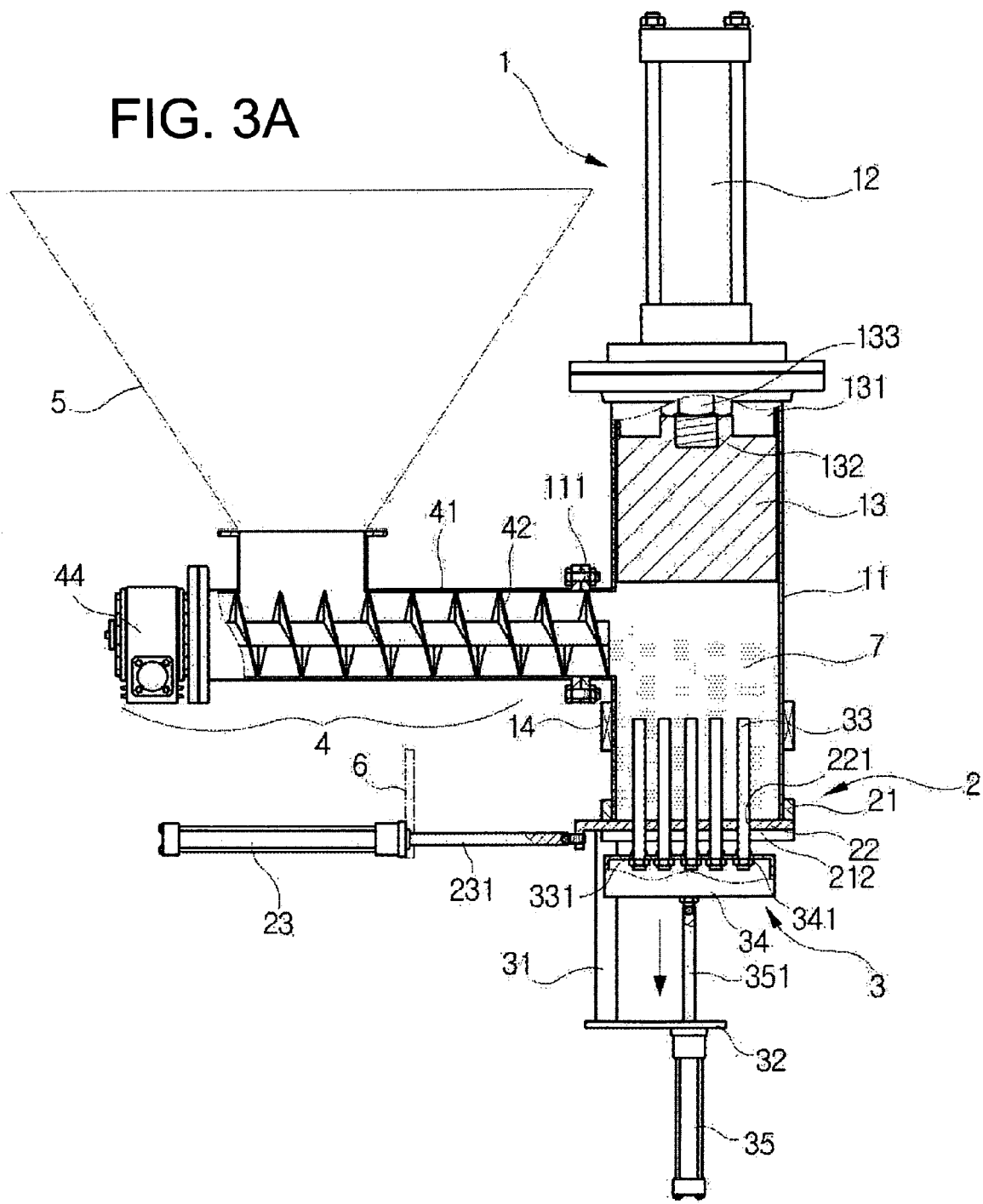
FIGS. 3A, 3B and 3C are views illustrating operations of the apparatus for removing foreign matters from construction waste according to the present invention.

At this time, as shown in FIG. 3A, since the shooter 22 closes the lower end of the casing 11 and the heaters 33 project through the guide holes 221 of the shooter 22 into the inside of the casing 11, the foreign matters introduced into the casing 11 are softened or fused by the heat generated by the heaters 33, to be reduced in volume.

Figure 3B:
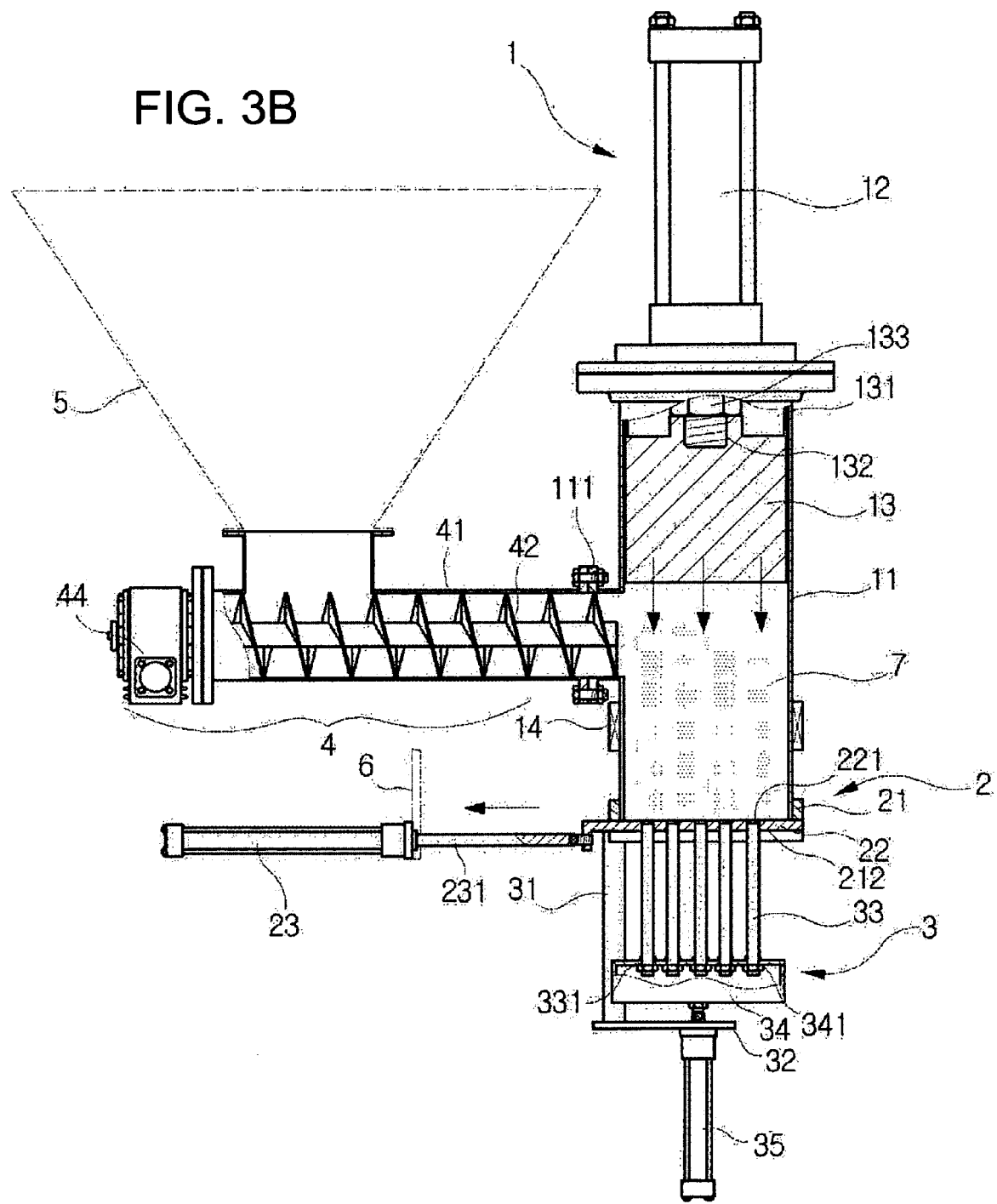

Then, when the predetermined amount of foreign matters are collected in the casing 11, the moving cylinder 35 is operated and the heater support plate 34 which is secured to the piston rod 351 of the moving cylinder 35 is moved downward. By this fact, as shown in FIG. 3B, the heaters 33 which are kept projecting into the inside of the casing 11 are retracted into the guide holes 221 defined in the shooter 22.

At this time, the upper ends of the heaters 33 are not completely disengaged from the guide holes 221 and are kept fitted into the guide holes 221 by a predefined length, so that the heaters 33 can be easily inserted into the inside of the casing 11 through the guide holes 221 in a subsequent operation cycle.

Figure 3C:
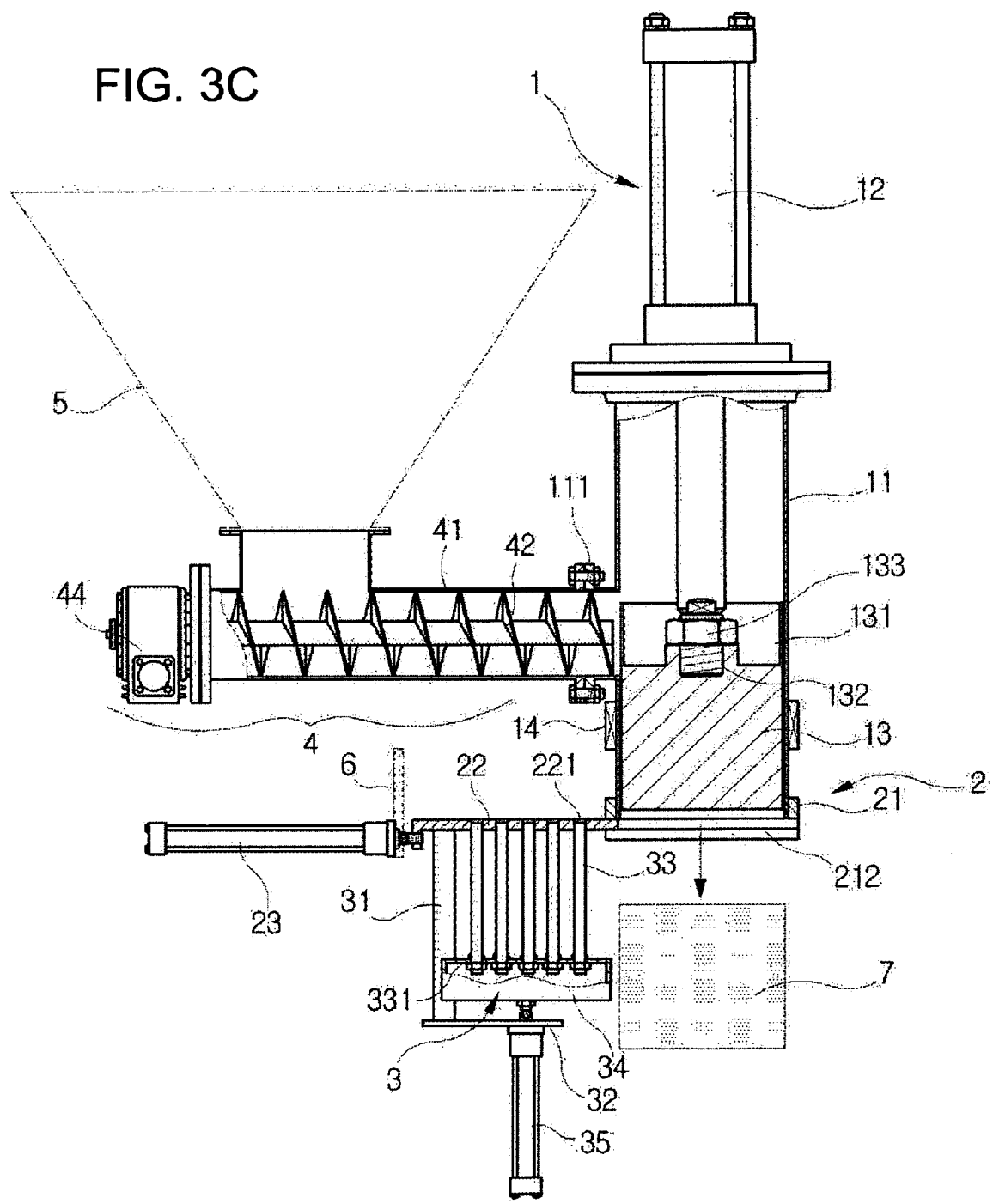
Figure 4:
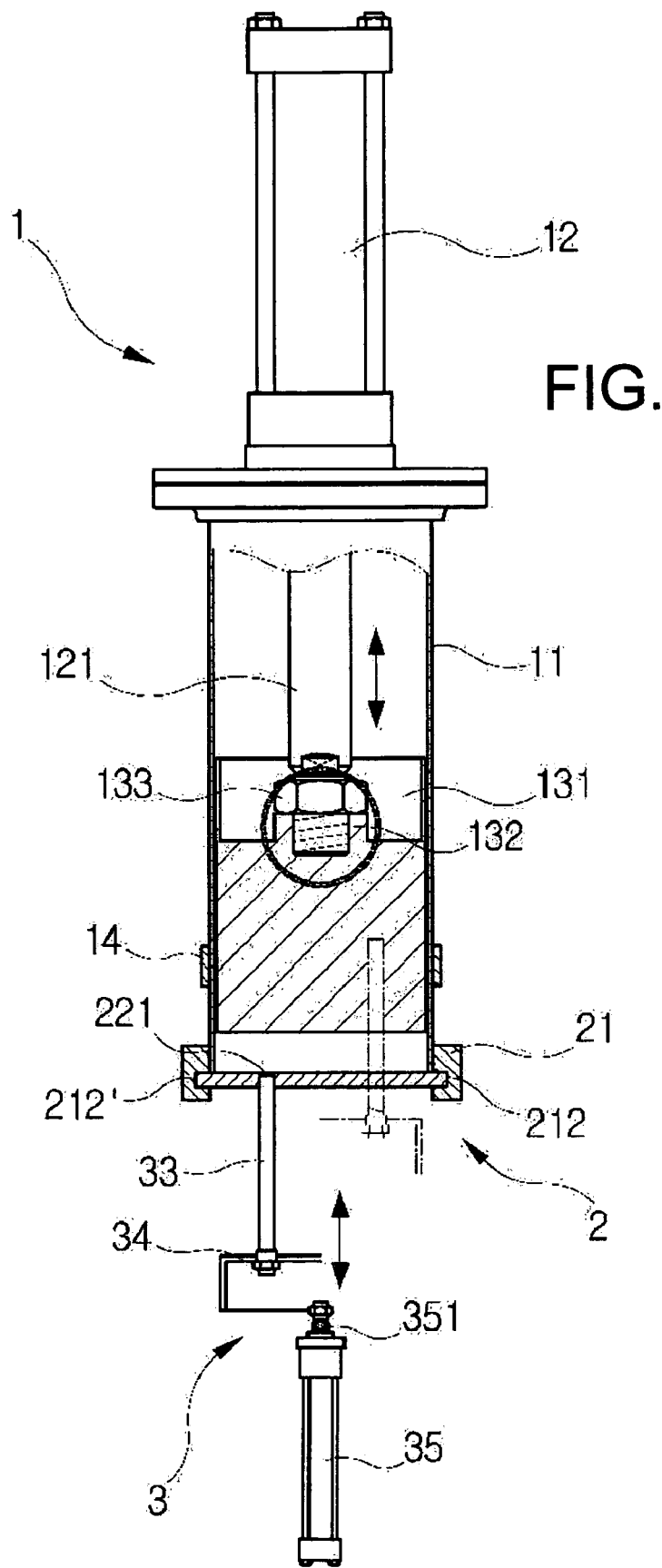
FIG. 4 is a longitudinal sectional view of the apparatus for removing foreign matters from construction waste according to the present invention.

Next, the compression cylinder 12 which is provided to the upper end of the casing 11 is actuated. As the piston rod 121 of the compression cylinder 12 is extended out of the compression cylinder 12, the compression plunger 13 is moved downward as shown in FIG. 3C. Accordingly, the foreign matters which are maintained in the softened or melted state are gradually compressed to be reduced in volume.

In a state in which the foreign matters filled in the casing 11 are compressed with the downward movement of the compression plunger 13, as the opening and closing cylinder 23 is actuated, the piston rod 231 of the opening and closing cylinder 23 is retracted into the opening and closing cylinder 23.

At the same time the piston rod 231 of the opening and closing cylinder 23 is retracted into the opening and closing cylinder 23, the shooter 22 which is coupled to the piston rod 231 of the opening and closing cylinder 23 is moved leftward as shown in FIG. 3C, and the lower end of the casing 11 is fully opened.

In this state, as the compression cylinder 12 is further actuated, the lower end of the piston rod 121 of the compression cylinder 12 is moved downward to substantially flush with the lower end of the casing 11, and the compressed foreign matters are discharged out of the casing 11.

After the foreign matters filled in the casing 11 are discharged to the outside, the compression cylinder 12 is actuated backward to retract its piston rod 121 therein so that the compression plunger 13 can be positioned adjacent to the upper end of the casing 11. Thereupon, the opening and closing cylinder 23 is also actuated backward to extend its piston rod 231 out of it so that the shooter 22 having been moved leftward in the sliding grooves 212 and 212' can be moved rightward to close again the lower end of the casing 11.

Thereafter, the heaters 33 which are retracted into the guide holes 221 of the shooter 22 are extended into the inside of the casing 11 by virtue of the piston rod 351 of the moving cylinder 35 which is actuated backward as well. In this way, one operation cycle of the apparatus is completed, and it is possible to continuously discharge foreign matters in a compacted state.

As is apparent from the above descriptions, the apparatus for removing foreign matters from construction waste according to the present invention provides advantages in that foreign matters such as Styrofoam, vinyl, paper, wood scraps, and so on, contained in soil sorted to have a substantially uniform grain size after undergoing a crushing process, are sucked into a cyclone by suction force from a blower, collected at a place, and then heated and compressed to a reduced volume to improve foreign matter separation efficiency, whereby it is possible to obtain quality recycled soil.

Also, because the foreign matters separated by the cyclone are collected at a place and then heated and compressed to a reduced volume, it is possible to prevent the fine powder of the foreign matters from rising to the surrounding environment, and avoid the pollution of the surrounding environment.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An apparatus for removing foreign matters from construction waste, comprising:

a feeding section installed at a lower end of a hopper;

a heating and compressing section having an entrance which is coupled to the feeding section and an exit which is defined at a lower end of the heating and compressing section; and a shooter opening and closing section coupled to the exit of the heating and compressing section;

wherein the heating and compressing section comprises a hollow casing having a vertical flange on a side thereof, a compression cylinder installed on the casing, a compression plunger fitted into the casing and coupled to a piston rod of the compression cylinder, and a band heater wound on a circumferential outer surface of and adjacent to a lower end of the casing, wherein the shooter opening and closing section has an opening and closing body which comprises a panel fitted around the lower end of the casing and having a pair of sliding channels defined on both sides of a lower end thereof; and a shooter which is to be fitted into the sliding channels is coupled to a piston rod of an opening and closing cylinder secured to a frame, and wherein a heating section is provided below the shooter opening and closing section in such a way as to be capable of reciprocation in a vertical direction; the shooter has a pair of connection members which are respectively connected to both sides of the shooter to extend in the vertical direction and have a predetermined length; a support panel is integrally coupled to lower ends of the connection members to extend in a horizontal direction and is defined with a through-hole; a heater support plate, into which a plurality of heaters are fitted, is placed between the shooter and the support panel and is coupled to a piston rod of a moving cylinder which is secured to the support panel; and the shooter which faces the heater support plate is defined with a plurality of heater guide holes through which the heaters pass, respectively.

2. The apparatus according to claim 1, wherein the compression plunger has a cylindrical configuration and is defined at an upper end thereof with a depression which has a predetermined depth; and an internal thread is formed at a center portion of the compression plunger in the depression such that a lower end of the piston rod of the compression cylinder is threadedly coupled to the internal thread along with a release prevention nut.

3. The apparatus according to claim 1 wherein the heater support plate has a box-shaped configuration which is opened at a lower end thereof; a plurality of threaded holes are defined through the heater support plate; and threaded portions are formed adjacent to lower ends of the heaters such that the threaded portions are threadedly coupled to the heater support plate in the threaded holes.

4. The apparatus according to claim 3, wherein the compression plunger has a cylindrical configuration and is defined at an upper end thereof with a depression which has a predetermined depth; and an internal thread is formed at a center portion of the compression plunger in the depression such that a lower end of the piston rod of the compression cylinder is threadedly coupled to the internal thread along with a release prevention nut.

* * * * *